United States Patent [19]

Medwed

[11] Patent Number: 4,515,546
[45] Date of Patent: May 7, 1985

[54] MOLDING APPARATUS PROVIDED WITH SEPARABLE MOLD PARTS

[75] Inventor: Emmerich Medwed, Wolfertschwenden, Fed. Rep. of Germany

[73] Assignee: Multivac Sepp Haggenmuller, KG, Fed. Rep. of Germany

[21] Appl. No.: 498,391

[22] Filed: Oct. 11, 1983

Related U.S. Application Data

[63] Continuation of Ser. No. 242,355, Mar. 10, 1981, abandoned.

[30] Foreign Application Priority Data

Mar. 14, 1980 [DE] Fed. Rep. of Germany ... 8007087[U]

[51] Int. Cl.³ .............................. B29C 1/16; B29C 3/00
[52] U.S. Cl. ..................................... 425/195; 425/185;
425/186; 425/193; 425/388; 425/398
[58] Field of Search ............... 425/185, 193, 195, 388,
425/186, 398, 399, 225; 100/278

[56] References Cited

U.S. PATENT DOCUMENTS

| | | |
|---|---|---|
| Re. 25,484 | 11/1963 | Kostur . |
| 643,235 | 2/1900 | Rogert et al. ...................... 425/398 |
| 752,505 | 2/1904 | Arnett ................... 100/278 |
| 2,869,179 | 1/1959 | Van Hastesreldt ................. 425/398 |
| 3,387,332 | 6/1968 | Pitsch ..................... 425/398 |
| 3,570,067 | 3/1971 | Jones et al. ........................ 425/398 |
| 3,809,739 | 5/1974 | Gelin . |
| 3,995,763 | 12/1976 | Ayres ................................. 425/398 |
| 4,134,716 | 1/1979 | John, Jr. ............................. 425/186 |

Primary Examiner—James Lowe
Attorney, Agent, or Firm—Robert T. Gammons

[57] ABSTRACT

The packaging machine has a molding station comprising a reciprocating molding die for shaping thermoplastic sheet material to form packaging containers. Reciprocating drive is transmitted to the molding die by first engagement means provided laterally thereon and cooperating second engagement means provided laterally of the moving path of the molding die and opposite the first engagement means. The molding die may be moved into a retracted position at one end of its moving path, and when in this retracted position, the first and second engagement means are disengaged so that the molding die and any members secured thereto may be readily removed for replacement thereof and/or of molding inserts provided in a lower part of the molding station. In a preferred embodiment, the first and second engagement means are formed by a driving chain and engagement members, respectively, the engagement members being shaped to engage the chain links.

7 Claims, 5 Drawing Figures

MOLDING APPARATUS PROVIDED WITH SEPARABLE MOLD PARTS

This is a continuation of application Ser. No. 242,355 filed 3/10/81 and now abandoned.

BACKGROUND OF THE INVENTION

This invention generally related to molding apparatus for use in conjunction with packaging machines of the kind in which the packages are formed of thermoplastic sheet material and, more particularly, to a packaging machine provided with an improved molding apparatus which allows the molding die to be readily removed.

The molding apparatus of this invention generally comprises a shaping tool having an upper portion secured on a machine frame and a reciprocating lower tool portion cooperating therewith. The thermoplastic sheet material is clamped between the two tool portions. A molding die is provided in the upper tool portion and may be receiprocated between a lower position extending into the lower portion and an upper position retracted therefrom. Drive to the molding die is provided by a piston cylinder device mounted ahead the cover of the upper portion, the piston rod extending through the top cover to be connected with the molding die or with a plate supporting the same. The lower portion is adapted to receive partitions and/or molding inserts in accordance with the shape and the dimensions of the package parts to be formed. The molding die is adapted to the respective molding inserts or partitions and may be formed of several individual die members each of which is secured on its top side to the plate reciprocated by the piston rod. When the dimensions of the molding members are to be changed, the upper portion and its outer casing with the piston cylinder device and the molding dies arranged in the upper portion have to be removed from the molding station. Subsequently and from the bottom side, the die members may be unscrewed from the plate connected with the piston rod, and thereafter the new molding dies may be screwed thereto. After removing the upper portion, the lower portion is accessible so that the molding inserts or partition members may be replaced.

However, a shaping tool of this type suffers from the drawback that it requires a relatively large overall height and that the operations required for changing the dimensions, i.e. replacement of the molding die and the molding inserts or partition members, are very complicated.

In a conventional hot molding machine for molding pieces of plastics material, the upper portion of the molding die is secured on a yoke member from the bottom side. Through a driven pinion, the latter is in engagement with rack members vertically mounted in a frame, to be reciprocated towards the lower part of the tool and away therefrom. For replacement of the upper part of the tool, the yoke member is sufficiently moved upwardly to have sufficient space between the upper and lower tool parts for manipulation on the upper tool part.

OBJECTS OF THE INVENTION

It is a primary object of the invention to provide a molding apparatus for use in conjunction with packaging machinery comprising a molding die for shaping thermoplastic sheet material structured to allow the molding die to be easily removed.

A further object of the invention is to provide molding apparatus for use in conjunction with a packaging machine comprising a molding die for shaping thermoplastic sheet material structured to provide for reduced overall height reduced overall height.

A related object of the invention is to provide molding apparatus for use in conjunction with a packaging machine comprising a molding die for shaping thermoplastic sheet material structured to simplify replacement of the molding members.

A still further object of the invention is to provide molding apparatus for use in conjunction with a packaging machine comprising a molding die for shaping thermoplastic sheet material structured to allow the dimensions of the package parts to be molded to be easily modified by replacement of the molding die and eventually of molding inserts.

SUMMARY OF THE INVENTION

The inventive molding apparatus comprises a molding die for shaping thermoplastic sheet material into the desired package parts comprising a molding die reciprocable along a predetermined path, and wherein reciprocating drive is transmitted to the molding die by driving members laterally adjacent the moving path thereof. The driving members are in engagement with engagement members laterally provided on the opposed side of the molding die. The molding die may be moved into a retracted position at the end of its moving path, and in this retracted end position, the molding die is disengaged from its associated drive members. Thus, as soon as the molding die is in its retracted position, it is automatically disengaged from the reciprocating drive and may freely be removed from the top side of the shaping or molding station.

In accordance with preferred embodiments, the reciprocating drive members are endless chains provided on each side of the molding die, and the molding die has engagement members cooperating with the chain links in a manner to provide formlocking therebetween along a linear path of the driving chain. The driving chain is mounted on two spaced sprocket members, and when the engagement members of the molding die reach the end of the linear section of the chain between the two sprocket members, they will be automatically disengaged from the driving chain as the same passes into an arcuate portion on one of the sprocket members in a direction away from the molding die.

DESCRIPTION OF PREFERRED EMBODIMENTS

Further objects and advantages of the invention will stand out from the following description of exemplary embodiments with reference to the drawings, in which.

Figure 1:
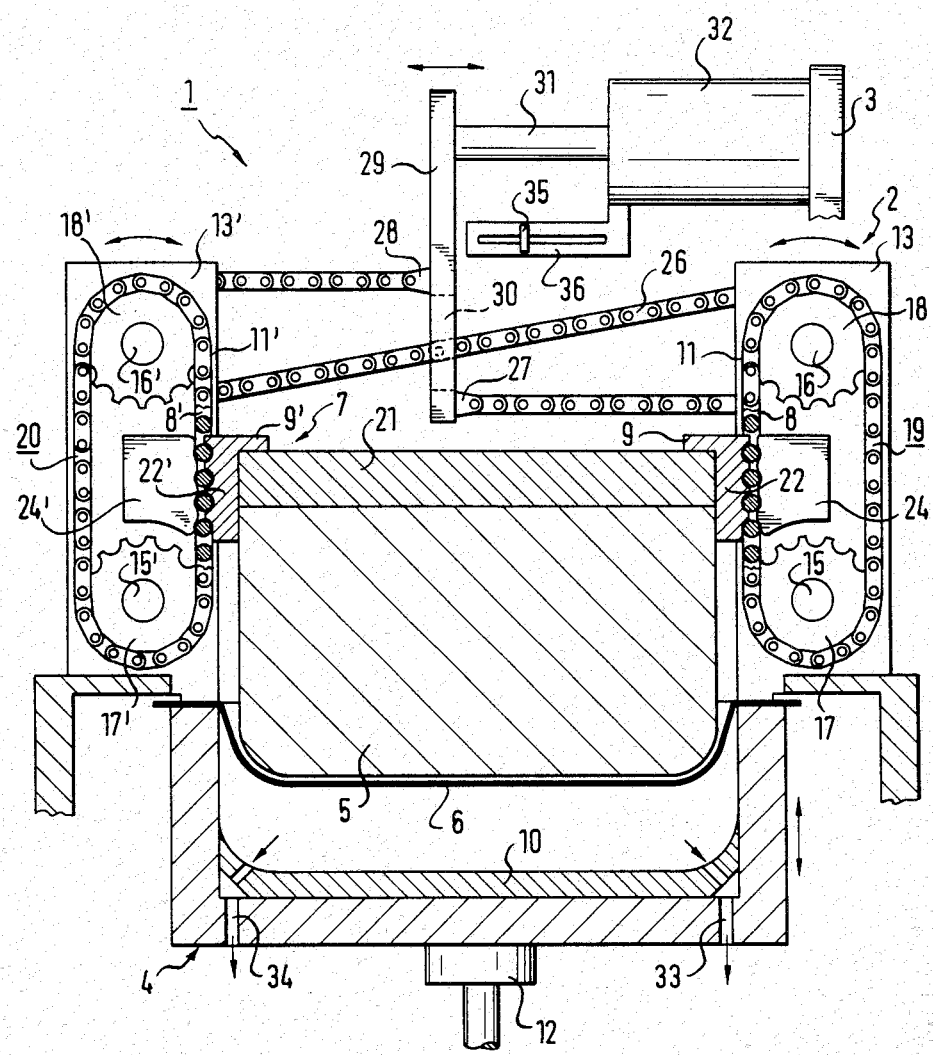
FIG. 1 is a partly sectional view of a molding tool along line I—I in FIG. 2.
Figure 2:
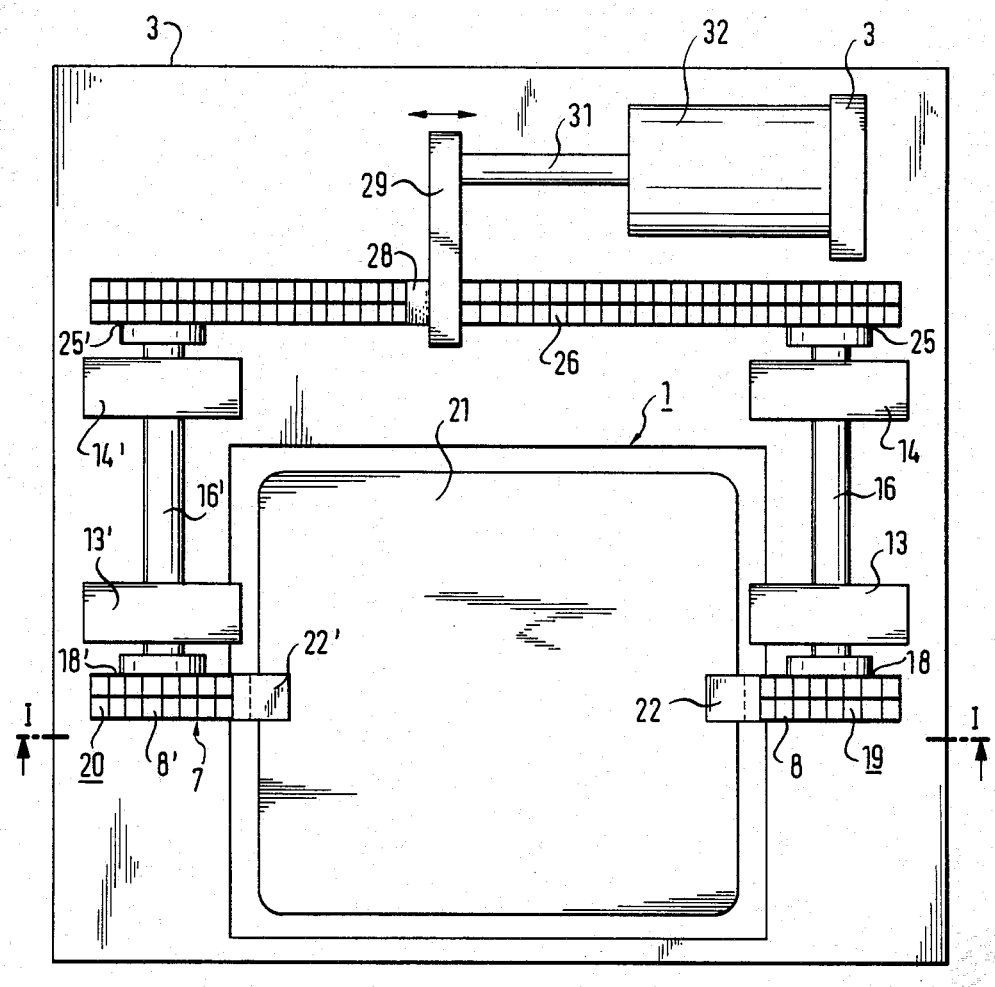
FIG. 2 is a plan view of the device shown in FIG. 1.

As best seen in FIGS. 1 and 2, the molding tool 1 has an upper portion 2 mounted on a machine frame 3 of the packaging machine and a lower portion 4 movable with respect thereto by a piston cylinder device 12 which is also connected with the frame 3 and which is only shown in schematic manner.

The upper portion 2 has two supporting bases 13, 13' which are vertically arranged and, as seen in FIG. 2, second supporting bases 14, 14' mounted in spaced relationship behind these on the frame 3. The supporting bases 13, 14 and 13', 14' have bearings or axes for one lower shaft 15, 15' and a second shaft 16, 16' mounted vertically thereabove in spaced relationship, respectively. First and second sprocket wheels 17, 17' and 18, 18' are mounted on the ends of the shafts 15, 15' and 16, 16' shown in FIG. 1, respectively. The sprocket wheel pair 15, 16 drives a first chain 19 and the sprocket wheel pair 15', 16' drives a second chain 20.

As seen in FIG. 2, the supporting bases 13, 13' are mounted on the frame in such a manner that the sprocket wheel pairs 15, 16 and 15', 16' are arranged laterally above an opening of the lower portion 4 and substantially centrally with respect to the respective edge.

Figure 3:
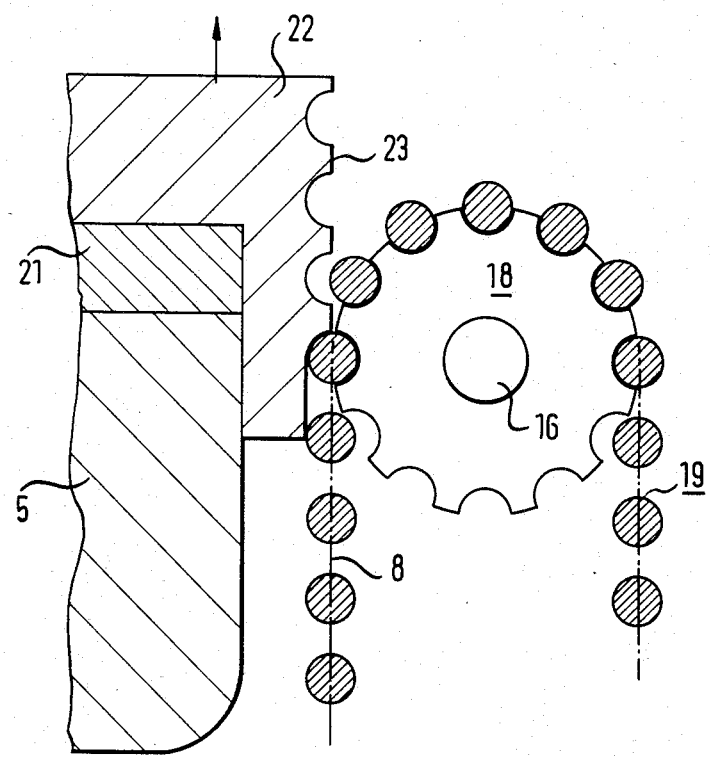
FIG. 3 is a partial view of the device shown in FIG. 1, the molding die being brought into a position for removal.

The upper portion has a plate 21 laterally having blocks 22, 22' on its sides directed towards the chains 19, 20, thus also centrally with respect to the edges and above the lower portion, these blocks being secured on the plate e.g. by screws which are not shown. On their vertical outer faces 23, 23', as best seen in FIG. 3, the blocks are surfaced in a manner similar to a chain rod. The block 22 engages the first chain through its teeth members, and the block 22' engages the second chain 20 through its teeth members. On each side opposed to a block, a reactive support member 24, 24' is provided for providing proper driving engagement between the blocks and the chains.

A molding die 5 is replaceably mounted on the lower side of the plates 21, e.g. by screws which are not shown. The molding die 5 is shaped in a manner to be adapted to a molding insert 10 provided in the lower portion. There may be a single molding die for a molding part assuming substantially the entire sectional surface of the lower portion. In case a plurality of packaging members are to be produced laterally adjacent one another, and in case a corresponding molding insert having eventually corresponding partitions is inserted into the lower portion, the molding die will be made of a corresponding number of die portions screwed to the plate 21.

As best seen in FIG. 2, on its ends opposed to those bearing the sprocket wheels 18, 18', the shafts 16, 16' have third sprocket wheels 25, 25' behind the second supporting bases 14, 14', when FIG. 1 is considered. These are driven in opposite directions by a chain 26. To this end, as best seen in FIG. 1, the chain 26 is passed around the third sprocket wheels 25, 25' in the manner of a loop. One end 27 of the chain from the bottom side of the sprocket wheel 25 is secured on a holding plate 29 on the side directed towards the sprocket wheel 25. From this chain end, the chain passes from the bottom around the sprocket wheel 25 and thence through a slot 30 in the holding plate 29 to the bottom side of sprocket wheel 20' and therearound. The chain end 28 passing from the top side over the sprocket wheel 25' is secured to the holding plate 29 on the side directed towards the sprocket wheel 25' and above the slot 30. The location at which the end 27 of the chain is secured lies below the slot 30.

The holding plate 29 is connected with the piston rod 31 of a double-acting piston cylinder device 32 secured on the machine frame 3. The piston cylinder device 32 is supplied with a pressure medium through conduits which are not shown and through a corresponding control.

The above disclosed device operates as follows: In the starting position, the lower portion 4 is moved in usual manner downwardly from the upper portion so that a packaging container formed in the preceding operating cycle will be indexed and a sheet material portion to be shaped is moved between the upper and lower portions. In this position, the holding plate 29 is sufficiently moved in FIG. 1 towards the left hand side that the molding die 5 will be moved sufficiently upwardly by the chains 19, 20, that it will be located above the sheet material which has not yet been shaped. Subsequently, the lower portion 4 is moved upwardly with respect to the upper tool into the position shown in FIG. 1, so that the sheet material 6 will be safely clamped at its lateral edges between the upper and lower tools. Immediately after clamping, the molding die 5 will be pushed into the lower portion to a position close to the molding insert or adjacent thereto, so that the sheet material is shaped. Subsequently, the preformed sheet material is sucked in conventional manner through vacuum connections 33, 34 against the molding insert to produce the final shape. Simultaneously or subsequently, the molding die 5 is returned into its starting position out of the lower portion. Moving the molding die downwardly and returning the same into its starting position are performed by moving the holding plate 29 in FIG. 1 sufficiently to the right hand side by the piston cylinder device 32 and through the piston rod 31 that the molding die is first moved through the chain 26 and the sprocket wheels 25, 25', shafts 16, 16' and the chains 19, 20 downwardly into the molding member and moved out of the same towards the left hand side by returning the holding plate 29.

When it is desired to replace the molding insert 10 and/or the molding die 5 for changing the dimensions of the container parts to be shaped, by actuating the piston cylinder device, the molding die 5 is moved sufficiently upwardly into the position shown in FIG. 3 that only the lowermost tooth of the vertical outer surface 23, 23' of the blocks 22, 22' will rest on the chains 19, 19'. As seen in FIG. 3, the molding die 5 may simply be removed from the shaping tool together with the plate 21 and the blocks 22, 22' in the direction of an arrow 37. The molding dies 5 themselves are directly accessible and may be replaced by another plate 21 with corresponding other molding dies. If desired, the molding dies on the plate 21 may be replaced. After removing the molding die 5 from the shaping tool, there will be an opening of corresponding size through which the molding inserts 10 are accessible from above for replacement. Subsequently, the plate 21 and the blocks secured thereto as well as the new molding dies screwed thereto are replaced on the chains by inverting the above operations, and the molding die is returned to its starting position by displacement of the holding plate 29 so that the molding operation may begin anew in the manner disclosed above.

In the above disclosed exemplary embodiment, the driving system is shown as a chain mechanism. Generally, other types of driving systems may be used which would laterally engage the blocks. For example, catch members driven by piston cylinder devices may be provided at the locations corresponding to the chains to engage the blocks and reciprocate the same just as the chains would do. The catch members would be formed in such a manner that they would allow removal of the plate 21 and the molding die in the manner disclosed above from a retracted terminal position.

In the above disclosed exemplary embodiment, the two chains 19, 20 on both opposed sides of the molding die are driven by a common driving system. Generally, two separate driving systems may be provided to drive each chain separately. However, a common drive assures that both chains are driven in perfectly uniform manner to prevent any tilting of the molding die during the reciprocation thereof.

The above disclosed invention allows simple and quick equipment of the molding tool in response to the desired dimensions of the packages to be produced. Furthermore, no vertically arranged piston cylinder devices are required for driving the molding die so that the overall height may be reduced.

The vertical spacings of the shaft 16 from shaft 15 and shaft 16' from shaft 15' will be selected in function of maximum stroke of the molding die.

In the above disclosed embodiment, the drive will be through the upper shafts 16, 16'. Preferably, the drive should be provided by the lower shafts 15, 15' to further reduce the overall height. However, for a better representation, the drive is shown as being provided by shafts 16, 16' in the drawings.

As seen in FIG. 1, an abutment bar 36 connected to the frame in this embodiment, is provided with an abutment 35. The abutment 35 is mounted in a longitudinal slot extending parallely to the moving direction of the piston rod 31 and may be displaced within this longitudinal slot after loosening a clamping device. Reciprocation of the holding plate 29 is limited in adjustable manner by the abutment 35. The stroke of the molding die 5 into the lower portion 4 will be limited thereby. If desired, a similar abutment limitation which is not shown may be provided for the holding plate 29 to limit the path of the molding die upwardly into the opposite direction. However, the limitation of the stroke may also be made by control of a pneumatic system actuating the double-acting piston cylinder device 32.

Generally, it is conceivable to use laterally arranged spindles with a common drive instead of the system 7 including the chain drive, the blocks 22, 22' laterally engaging the vertically extending spindles. However, spindles are less advantageous in view of the heavy weight and the high operating speeds with which the stroke movements of these shaping tools are performed.

Figure 5:
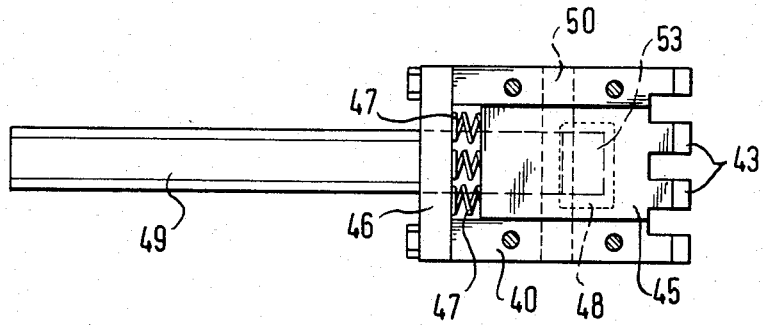
FIG. 5 is a sectional view along line V—V in FIG. 4.
Figure 4:
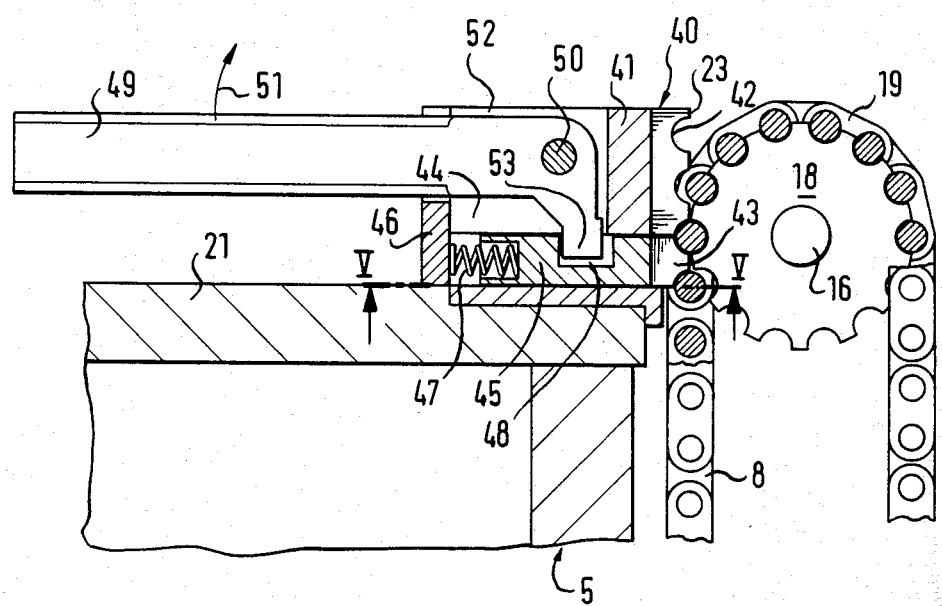
FIG. 4 is a partial view similar to FIG. 3, but showing another embodiment.

FIGS. 4 and 5 show another embodiment in which similar parts are indicated by the same reference numerals as in the preceding embodiment. The basic difference lies in another embodiment of the blocks 40 instead of the blocks 22, 22' of the preceding embodiment. The blocks 40 define a housing 41 which is secured to plate 21 by bolts (not shown) and has recesses 42 for engagement with a chain 19, the recesses 42 being provided on the vertical outer surface 23 just as with the blocks 22, 22', to form an engagement member. The vertical surface 23 will thus present a face having a plurality of teeth lying one above another. A recess 44 is provided in the lower portion of the housing 41. The lowermost tooth 34 of the vertical surface is integrally formed with a slider 45 and may be moved towards the left hand side in FIG. 4 within the recess 44 in horizontal direction. On its rear side, the housing 41 is closed by a plate 46 screwed to the housing. The plate 46 acts as an reaction support of a plurality of pressure springs 47 which bias the slider 45 away from the plate 46 in the manner shown in FIG. 4. The slider 45 is provided with a recess 48 on its top side. Further, a handle 49 is provided and extends at one end thereof to the housing 41. The handle is pivoted to the housing by an axis 50 to be pivotable in the direction of arrow 51. To this end, the housing is provided with a recess 52 on its top side. At its end projecting into the housing, the handle 49 has a catch member 53 extending into the recess 48.

The axis 50 is substantially parallel to the shaft 16. The dimensions of the recess 48 are selected in such a manner that, in the lowermost position of the handle shown in FIG. 4, the springs 47 will sufficiently advance the slider 45 towards the chain 19 so that the lowermost tooth 43 will be aligned with the remaining teeth in vertical direction. In this position, all of the teeth will together form an engagement member which may be brought into engagement with chain 19 for reciprocating drive.

If it is desired to replace the molding die 5, the upper portion will be sufficiently moved upwardly, as shown in FIG. 4, that only the lowermost tooth 43 will be in engagement with chain 19, just as with the previously disclosed embodiment. Then, the operator will seize a pair of opposed handles 49 to move them upwardly about axis 50, as indicated by arrow 51. This will move the slider 45 sufficiently into its retracted position against the action of springs 47 that the respective lowermost teeth 43 will be removed from engagement with the chains, so that the member supporting the molding die may be removed in upward direction. Replacement is performed by an inverse operation. The handles 49 are seized, and just by the inherent weight of members to be replaced, the handles will thereby be moved upwardly in the direction of arrow 51 to move the slider 45 into the retracted position. Thus, it will be possible to insert the member to be replaced into the position shown in FIG. 4 in which the first, stationary tooth of housing 41 will rest on the chain. Subsequently, the handles are released. The biasing spring 47 will now return the slider 45, and thus the handle 49, into the position shown in FIGS. 4 and 5, bringing the lowermost tooth 43 in engagement with the chain to provide driving engagement with the driving member of the driving system. As the blocks 40 are provided on the opposed sides of the plate 21 instead of the blocks 22, 22', corresponding to the embodiment of FIG. 1, by operating the handles, the plate 21 may be removed in upward direction and inserted again without using any tools.

It should be understood that the above description is in no way limitative to the invention and that many modifications and improvements may be brought thereto without departing from the true spirit of the invention.

What is claimed is:

1. A molding die for shaping thermoplastic sheet material and means for reciprocating said molding die along a moving path comprising first engagement means provided laterally on said molding die and cooperating second engagement means provided laterally of said moving path and opposite said first engagement means, said second engagement means comprising chain drive means and said first engagement means comprising drive members formed with teeth to mesh with the link members of said chain drive means when in position laterally adjacent thereto, said moving die being movable into a retracted position at one end of said moving path in which said first and second engagement means are disengageable, whereas said first and second engagement means are in driving engagement when said molding die is moved along said moving path and wherein said chain drive means comprises sprocket members on which an endless chain is mounted and wherein said moving path of said molding die extends along a linear part of said chain terminating in an arcuate part of said sprocket member, and wherein disengagement between said chain link members and said driving members is provided by moving said driving members into a position generally opposite to said sprocket members and to said arcuate part of said chain.

2. A molding die according to claim 1, comprising a shaping station having an upper shaping tool portion and a lower shaping tool portion, said molding die being mounted on said upper shaping tool portion, and said lower shaping tool portion being provided with replaceable molding inserts which are accessible through said upper shaping tool portion when said molding die is removed.

3. A molding die according to claim 1, wherein said first engagement means comprise a slider member adapted to be selectively moved into a first position of engagement with said second engagement means and into a second position disengaged from said second engagement means by a sliding motion.

4. A mold die according to claim 3, wherein said slider is slidably mounted in a housing secured to or integral with said first engagement means and pivotally supporting an operating lever for operating said slider into said first or second positions.

5. A molding die according to claim 3 or 4, wherein said slider is spring-biassed into its first position.

6. A molding die according to claim 4 wherein the said slider is spring-biased into its first position.

7. A molding die for shaping thermoplastic sheet material comprising a lower mold part,
an upper mold part
and driving means for moving said upper mold part from a retracted position to a position of engagement of said upper mold part with said lower mold part and back in a reciprocating manner by rectilinear movement,
said driving means being arranged laterally of said upper mold part and comprising an engagement member which is cooperating with driven means connected to said upper mold part and which is reciprocatingly movable by said driving means from a lower position to an upper position along a predetermined moving path to move said upper mold part from said position of engagement to said retracted position thereof,
said moving path being selected such that when moving from said lower position to said upper position said engagement member moves out of engagement with said driven means by lateral movement of said engagement member whereby said upper mold part is released from said engagement member in said retracted position to be upwardly removed.

* * * * *